Figure 1:
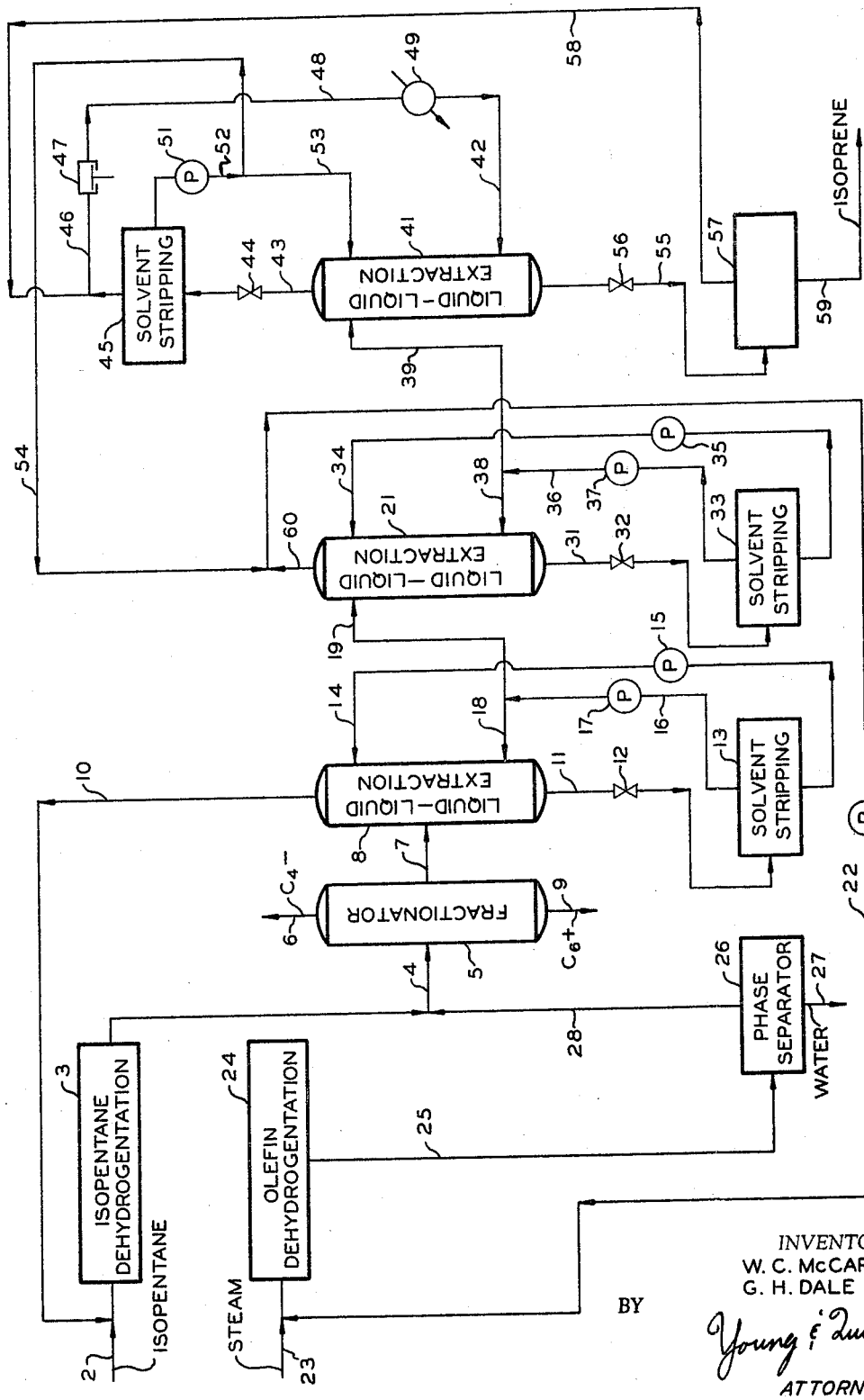

INVENTORS
W. C. McCARTHY
G. H. DALE

BY *Young & Quigg*

ATTORNEYS

United States Patent Office 3,264,363
Patented August 2, 1966

3,264,363
RECOVERY OF A DIOLEFIN WITH LIQUID METHANE
William C. McCarthy and Glenn H. Dale, Bartlesville, Okla., assignors to Phillips Petroleum Company, a corporation of Delaware
Filed Nov. 16, 1964, Ser. No. 411,467
15 Claims. (Cl. 260—681.5)

This invention relates to the recovery of a diolefin from an admixture of the diolefin with an olefin utilizing liquid methane as a selective solvent. In one aspect the invention relates to the use of liquid methane under extracting conditions to recover isoprene from a dehydrogenation effluent. In another aspect the invention relates to the recovery of isoprene from an admixture of isoprene with at least one monoolefin from which it is ordinarily difficult to separate.

Diolefins may be produced by many different methods, one of the most common being the cracking or dehydrogenation of petroleum oils and gases. In many such methods, the diolefins are found in an impure state, being admixed with hydrogen and with monoolefins and/or paraffins of various boiling points, as the chief impurities. For most chemical processes in which diolefins are used commercially, it is desirable to have a relatively high concentration of diolefins available and this is especially true when the diolefins are to be used to form rubber-like polymers, a purity of 95 percent or better being sometimes required for this purpose. While the hydrogen and the hydrocarbons having boiling points considerably different from the diolefins being purified may be removed easily by fractional distillation, it is very difficult to separate the diolefins from those hydrocarbons having boiling points close to the diolefins, since very efficient fractionation is required, and this is not commercially feasible in most cases, particularly when azeotropes are formed by the diolefins and impurities.

Because of the difficulty of obtaining substantially pure diolefins by distillation methods alone, solvent extraction has been utilized in an attempt to separate diolefins in a high state of purity from hydrocarbon mixtures. While it is comparatively easy to make such a separation from paraffin hydrocarbons, it has been found that the separation from monoolefins is more difficult because many solvents which are selective for diolefins have a considerable affinity for monoolefins also. Accordingly, it has become desirable to find a solvent which will selectively separate diolefins from monoolefins.

It has now been discovered that liquid methane can be utilized as a selective solvent to separate a diolefin from a monoolefin. In one embodiment a stream containing isoprene and monoolefins with at least 72 weight percent isoprene can be contacted with a liquid methane stream to substantially increase the isoprene concentration in the raffinate stream. In another embodiment of the invention a stream containing isoprene and monoolefins is contacted in a liquid-liquid extraction zone with an upwardly flowing stream of liquid methane and a downwardly flowing stream of a secondary solvent to provide a product concentrated in isoprene.

It is an object of the invention to provide a novel method for the recovery of a diolefin from a mixture of the diolefin with monoolefins. It is an object of the invention to provide a novel and improved method of concentrating an isoprene stream. A further object of the invention is to provide a process for obtaining a high purity diolefin stream in a commercially practicable manner. Another object of the invention is to provide a novel and improved method for the recovery of isoprene from a mixture of hydrocarbons, for example the effluent from a dehydrogenation reaction. It is another object of the invention to provide a combination of steps for the recovery of isoprene in a technically and economically feasible manner.

Other aspects, objects and advantages of the invention will be apparent from a study of the disclosure, the drawings and the appended claims.

Figure 2:
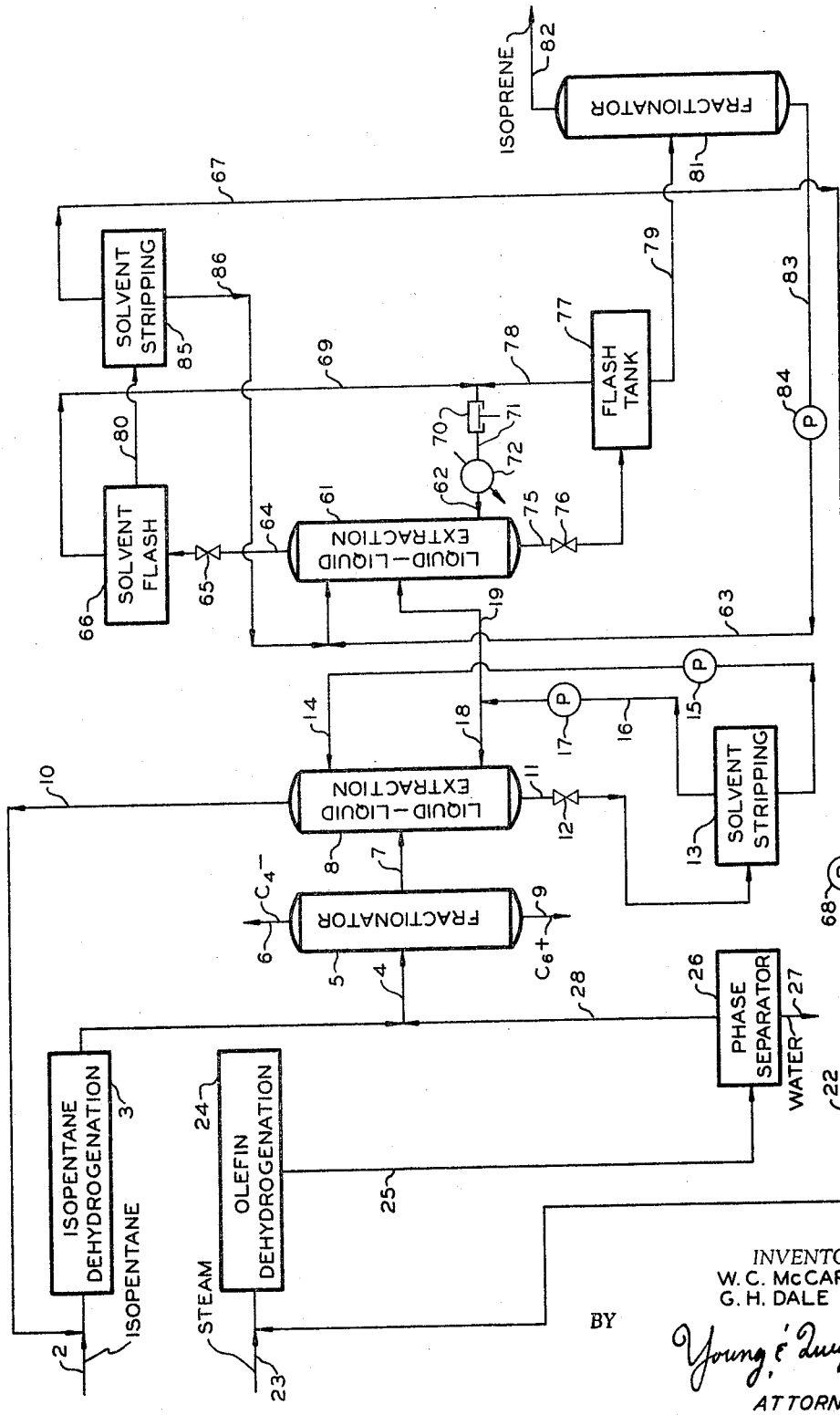

In the drawings FIGURE 1 is a schematic representation of a process in accordance with a first embodiment of the invention for recovering a stream having a high concentration of isoprene, and FIGURE 2 is a schematic representation of a process in accordance with a second embodiment of the invention for recovering isoprene utilizing dual solvents.

While the invention is broadly applicable to the separation of a diolefin from a mixture of the diolefin with a monoolefin, for sake of simplicity the invention will be described in terms of the separation of isoprene from the effluent of a two-stage process for the dehydrogenation of isopentane. The purification of isoprene from this effluent is difficult to effect by ordinary fractional distillation. This is evidenced by the following table showing the boiling points of the principal components of the $C_5$ fraction of the isopentane dehydrogenation effluent and their relative volatility compared to isoprene:

| Component | B.P., °C. | Relative Volatility to Isoprene |
|---|---|---|
| 3-Me-butene-1 | 20.2 | 1.58 |
| Isopentane | 27.9 | 1.23 |
| 2-Me-butene | 31.1 | 1.11 |
| Isoprene | 34.0 | 1.00 |
| 2-methylbutene-2 | 38.5 | 0.86 |

From the order of boiling points, it will be seen that to accomplish the desired separations by ordinary fractional distillation, the $C_5$ fraction has to be resolved into its individual components. The three amylenes would have to be recombined for recycle to the second dehydrogenation stage. Because of the small spread in boiling points, good separations by fractional distillation require a large number of trays. Therefore, extremely expensive fractionation equipment is needed in order to effect the separation of individual constituents. Furthermore, if a fractional distillation is made upon the effluent of the two-stage isopentane dehydrogenation at extremely high reflux ratios to obtain very narrow fractions, prolonged heating of the mixtures is involved; and as a result, considerable polymerization of the more unsaturated compounds commonly occurs. Thus, fractional distillation alone as a means for separating very narrow fractions from such mixtures is disadvantageous. Complex mixtures such as above tabulated can be advantageously resolved into their individual constituents by a process in accordance with the present invention.

Referring now to the drawing, and to FIGURE 1 in particular, isopentane is passed by way of pipe 2 into dehydrogenation zone 3 wherein there is produced an effluent stream containing isopentane, the methyl butenes and isoprene. This stream is passed by way of pipe 4 to fractionator 5 from which there is removed as overhead by way of pipe 6 $C_4$ and lighter hydrocarbons. There is obtained from fractionator 5, as a side stream, a stream consisting essentially of isopentane, methyl butenes, and isoprene. This side stream is passed by way of pipe 7 to a first solvent extraction zone or column 8. Heavier materials from the fractionator 5 are removed as a bottoms stream through pipe 9. In the solvent-extraction zone 8, there is formed a raffinate phase containing essentially isopentane which is recovered and recycled by way of pipe 10 to dehydrogenation zone 3. Extract phase is passed by way of pipe 11 and valve 12 to solvent stripper zone 13 from which recovered solvent is removed and recycled by way of pipe 14 and pump 15, and extract material, consisting essentially of methyl butenes and isoprene, is removed by way of pipe 16 and pump 17. A portion of the material in pipe 16 is passed through pipe 18 into a lower portion of zone 8 as reflux while the remainder is passed through pipe 19 to a second solvent extraction zone 21. In solvent-extraction zone 21, there is formed a raffinate phase from which methyl butenes are recovered and recycled by way of pipes 60 and 22 to dehydrogenation zone 24. Steam is introduced into zone 24 by way of pipe 23. In zone 24, further quantities of isoprene are produced by dehydrogenation of the methyl butene stream, the effluent being passed by way of pipe 25 to phase separator 26 wherein water is separated and removed through pipe 27. The hydrocarbons are passed through pipe 28 to pipe 4 for treatment together with the isopentane-dehydrogenation zone effluent as already described above. The extract from solvent-extraction zone 21 which contains isoprene is passed by way of pipe 31 and valve 32 to solvent stripper 33 from which recovered solvent is recycled to zone 21 by way of pipe 34 and pump 35. The extract material, containing at least 72 weight percent isoprene with the remainder being primarily methyl butenes, is withdrawn from solvent stripping zone 33 by way of pipe 36 and pump 37. A portion of the material in pipe 36 is passed through pipe 38 to a lower portion of liquid-liquid extraction zone 21 as reflux while the remainder is passed through pipe 39 into liquid-liquid extraction zone 41. Solvents which can be used in extraction zones 8 and 21 include furfural, methyl carbitol, acetonitrile, ethylene glycol, the glycol ethers, etc.

In accordance with the invention, liquid methane is introduced by way of pipe 42 into a lower portion of liquid-liquid extraction column 41. Column 41 is operated at suitable temperature and pressure to maintain the methane in the liquid phase within column 41. The extract stream consisting primarily of methyl butenes and liquid methane is passed through pipe 43 containing a pressure reduction valve 44 into solvent stripper 45. The methane is vaporized upon passing through valve 44. The gaseous methane is withdrawn from stripper 45 and passed by way of pipe 46 to the inlet of compressor 47. The compressed methane is passed through pipe 48 and condenser 49 to liquefy the methane. The thus liquefied methane is returned to column 41 through pipe 42. The methyl butenes are withdrawn from separator 45 by way of pipe 51 and pump 52. A portion of the thus withdrawn methyl butenes can be returned through pipe 53 to an upper portion of column 41 as reflux while the remainder is passed through pipes 54 and 22 to olefin dehydrogenation zone 24. A high purity isoprene product stream containing some dissolved methane is withdrawn from the lower portion of column 41 by way of pipe 55 and passed through pressure reduction valve 56 into flash vessel 57 from which gaseous methane is recycled through pipe 58 to pipe 46. High purity isoprene free of methane is removed through pipe 59.

The utilization of a solvent selective for the minor component rather than the major component permits a substantial reduction in the amount of solvent required. Thus the requirements for liquid methane, which is selective for the monoolefins, the minor component, in liquid-liquid extraction zone 41 are considerably less than would be the requirements for a conventional solvent which is selective for isoprene. For example a feedstream containing 80 parts isoprene and 20 parts monoolefin would require only approximately 880 parts of liquid methane as opposed to approximately 3520 parts of a conventional solvent selective for isoprene, assuming equal solubility in each solvent of approximately 20% and a reflux to feed ratio of the absorbed component of 10 to 1. Similarly the use of a conventional solvent in extraction zone 21 to extract the isoprene fraction, which is generally the minor component in zone 21 provides for a minimum requirement of solvent. Thus the combination of a conventional solvent selective for the diolefin in zone 21 and liquid methane, which is selective for the monoolefin, in zone 41 minimizes the overall solvent requirements, providing a more complete separation with favorable economies.

Referring now to FIGURE 2 there is illustrated a second embodiment of the invention with those elements common to FIGURE 1 being designated by the same numerals. The hydrocarbon stream comprising primarily isoprene and methyl butene passing through pipe 19 is introduced into dual liquid-liquid extraction column 61. Liquid methane is introduced into a lower portion of column 61 by way of pipe 62 while a dual solvent is introduced into an upper portion of column 61 by way of pipe 63. Column 61 is operated at a temperature and pressure to maintain the methane in the liquid phase. The dual solvent is immiscible with liquid methane and thereby establishes two liquid phases in the extractor regardless of the concentration of isoprene in the feedstream. This permits recovery of high-purity isoprene from a feedstream containing low concentrations of said isoprene. A more efficient separation is also obtained because liquid methane is selective for monoolefins whereas the dual solvent is selective for isoprene.

Examples of solvents suitable for use as the dual solvent include alcohols such as methyl alcohol, ethyl alcohol, and the like, acetone, paraffinic hydrocarbons such as heptane, decane and the like, aromatics such as toluene, benzene, and the like, and cycloparaffins such as methylcyclopentane, etc. and mixtures thereof. Any solvent selective for diolefins immiscible with liquid methane and having a very low freezing point will suffice.

The dual solvent passes downwardly through column 61 selectively absorbing the isoprene while the liquid methane passes upwardly selectively absorbing the methyl butenes. The methane stream rich in methyl butenes is withdrawn from column 61 and passed by way of pipe 64 and valve 65 into solvent flash vessel 66 wherein the methane is vaporized due to the drop in pressure across valve 65. The methyl butenes containing some methyl alcohol are passed by way of pipe 80 into solvent stripper 85 from which butenes are withdrawn and passed by way of pipe 67, pump 68 and pipe 22 into olefin dehydrogenation zone 24. Alcohol is recycled via pipe 63. The gaseous methane is withdrawn from stripper 66 and passed by way of pipe 69 to the inlet of compressor 70. The compressed methane is passed through pipe 71 into condenser 72 wherein the methane is liquefied. The liquefied methane is returned to column 61 by way of pipe 62. The dual solvent stream rich in isoprene and containing some methane is withdrawn from column 61 and passed by way of pipe 75 and reducing valve 76 into flash tank 77 to vaporize the methane. The gaseous methane is passed from flash tank 77 through pipe 78 to the inlet of compressor 70. The dual solvent containing isoprene is then passed through pipe 79 into fractionator 81. The isoprene is withdrawn from fractionator 81 by way of pipe 82 and passed to a point of storage or utility as desired. The dual solvent is withdrawn from fractionator 81 and returned to the upper portion of column 61 by way of pipe 83, pump 84 and pipe 63.

If desired, isoamylenes obtained by sulfuric acid extraction of catalytically cracked gasoline can be dehydrogenated rather than isopentane. In this event the isoamylene feedstock is fed to olefin dehydrogenation unit 24 and unit 3 is not required. Extractor 8 is not required, the effluent from fractionator 5 passing via line 7 direct to extractor 21 in FIGURE 1 or to extractor 61 in FIGURE 2.

The following examples are presented in further illustration of the invention and should not be construed to unduly limit the invention.

EXAMPLE I

In a process employing the system of FIGURE 1 beginning with conduit 19, aqueous methyl carbitol at 100% F. is utilized as the solvent in column 21. The composition of the feedstream in conduit 19 and various other streams are set forth in Table I in terms of pounds per hour.

*Table I*

| Stream No | 19 | 34 | 60 | 39 | 38 | 42 | 54 | 55 | 53 |
|---|---|---|---|---|---|---|---|---|---|
| Component: | | | | | | | | | |
| Methane | | | | | | 58,546 | | 510 | |
| Isobutene | 60 | | 60 | | | | | | |
| Butene-1 | 2 | | 2 | | | | | | |
| Trans-butene-2 | 2 | | 2 | | | | | | |
| Cis-butene-2 | 2 | | 2 | | | | | | |
| 3-methylbutene-1 | 728 | | 594 | 134 | 1,340 | | 130 | 4 | 1,300 |
| Isopentane | 325 | | 325 | | | | | | |
| Pentane-1 | 39 | | 39 | | | | | | |
| 2-methylbutene-1 | 2,789 | | 2,275 | 514 | 5,140 | | 500 | 14 | 5,000 |
| n-Pentane | 835 | | 835 | | | | | | |
| Trans-pentene-2 | 108 | | 108 | | | | | | |
| Cis-pentene-2 | 54 | | 54 | | | | | | |
| 2-methylbutene-2 | 3,837 | | 3,130 | 707 | 7,070 | | 689 | 18 | 6,890 |
| Isoprene | 5,406 | | 61 | 5,345 | 53,450 | | 100 | 5,245 | 1,000 |
| Water | | 46,500 | 8 | | | | | | |
| Methyl Carbitol | | 339,200 | 864 | | | | | | |
| Total | 14,187 | 385,700 | 8,359 | 6,700 | 67,000 | 58,546 | 1,419 | 5,791 | 14,910 |

EXAMPLE II

In a process employing the system of FIGURE 2 beginning with conduit 19, methyl alcohol is utilized as the dual solvent. The composition of the feedstream in conduit 19 and various other streams are set forth in Table II in terms of pounds per hour.

*Table II*

| Stream No | 19 | 63 | 62 | 67 | 78 | 75 | 64 | 86 |
|---|---|---|---|---|---|---|---|---|
| Component: | | | | | | | | |
| Isobutene | 60 | | | 60 | | | 60 | |
| Butene 1 | 2 | | | 2 | | | 2 | |
| Trans-butene-2 | 2 | | | 2 | | | 2 | |
| Cis-butene-2 | 2 | | | 2 | | | 2 | |
| 3-methylbutene-1 | 728 | | | 724 | | | 4 | 724 | |
| Isopentane | 325 | | | 325 | | | | 325 | |
| Pentene-1 | 39 | | | 39 | | | | 39 | |
| 2-methylbutene-1 | 2,798 | | | 2,775 | | | 14 | 2,775 | |
| n-Pentane | 835 | | | 835 | | | | 835 | |
| Trans-pentene-2 | 108 | | | 108 | | | | 108 | |
| Cis-pentene-2 | 54 | | | 54 | | | | 54 | |
| 2-methylbutene-2 | 3,837 | | | 3,819 | | | 18 | 3,819 | |
| Isoprene | 5,406 | | | 161 | | 5,245 | 161 | |
| Methane | | | | | 7,235 | 7,235 | 24,960 | |
| Methyl Alcohol | | 27,165 | 32,195 | | | 20,955 | 6,210 | 6,210 |
| Total | 14,187 | 27,165 | 32,195 | 8,906 | 7,235 | 33,471 | 40,076 | 6,210 |

Reasonable variations and modifications are possible within the scope of the foregoing disclosure, the drawings and the appended claims to the invention.

We claim:

1. A process for the separation of a diolefin from a monoolefin which comprises contacting a stream containing said diolefin and said monoolefin with liquid methane to produce an extract phase containing liquid methane and said monoolefin and a raffinate phase containing said diolefin.

2. A process in accordance with claim 1 further comprising flashing said raffinate phase to recover said diolefin as a product of the process.

3. A process in accordance with claim 1 further comprising flashing said extract phase to obtain a vaporous methane stream and a monoolefin product stream, compressing said vaporous methane stream, cooling the thus compressed vaporous methane stream to produce liquid methane, and recycling the thus liquefied methane to the step of contacting a stream with liquid methane.

4. A process in accordance with claim 1 wherein said diolefin is isoprene.

5. A process in accordance with claim 4 wherein said stream comprises at least 72 weight percent isoprene.

6. A process for obtaining a highly concentrated diolefin product stream from a feedstream comprising said diolefin and at least one monoolefin, which comprises introducing said feedstream into a first liquid-liquid extraction zone, contacting said feedstream in said first liquid-liquid extraction zone with a solvent which selectively absorbs said diolefin over said monoolefin to produce an extract phase containing a substantial portion of said diolefin and a small portion of said monoolefin in said solvent and a raffinate phase containing a substantial portion of said monoolefin, stripping the solvent from said extract phase to produce an extract concentrated with respect to said diolefin and recycling the thus recovered solvent to said first liquid-liquid extraction zone, introducing said extract into a second liquid-liquid extraction zone, contacting said extract in said second liquid-liquid extraction zone with liquid methane to produce a second extract phase containing liquid methane and a substantial portion of said monoolefin and a second raffinate phase containing said diolefine as a highly concentrated product.

7. A process for obtaining a highly concentrated diolefin product stream from a feedstream comprising a minor amount of said diolefin and a major amount of at least one monoolefin, which comprises introducing said feedstream into a first liquid-liquid extraction zone, contacting said feedstream in said first liquid-liquid extraction zone with a solvent which selectively absorbs said diolefin over said monoolefin to produce an extract phase containing a major amount of said diolefin and a minor amount of said monoolefin in said solvent and a raffinate phase containing a substantial portion of said monoolefins, stripping the solvent from said extract phase to produce an extract comprising at least 50 weight percent of said diolefin and recycling the thus recovered solvent to said first liquid-liquid extraction zone, introducing said extract into a second liquid-liquid extraction zone, contacting said extract in said second liquid-liquid extraction zone with liquid methane to produce a second extract phase containing liquid methane and a substantial portion of said monoolefin and a second raffinate phase containing said diolefin as a highly concentrated product.

8. A process in accordance with claim 7 wherein said diolefin is isoprene and said extract comprises at least 72 weight percent isoprene.

9. A process for obtaining a highly concentrated isoprene product stream from a feedstream containing at least one monoolefin and less than 50 weight percent isoprene, which comprises introducing said feedstream into a first liquid-liquid extraction zone, contacting said feedstream in said first liquid-liquid extraction zone with a solvent which selectively absorbs said isoprene over said monoolefin to produce an extract phase containing said monoolefin in said solvent, wherein said isoprene constitutes at least 72 weight percent of the extract phase exclusive of said solvent, stripping the solvent from said extract phase to produce an extract containing at least 72 weight percent isoprene and recycling the thus recovered solvent to said first liquid-liquid extraction zone, introducing said extract into a second liquid-liquid extraction zone, contacting said extract in said second liquid-liquid extraction zone with liquid methane to produce a second extract phase containing liquid methane and a substantial portion of said monoolefin and a second raffinate phase containing said isoprene in a highly concentrated form.

10. A process in accordance with claim 9 further comprising separating methane from said second extract phase and from said second raffinate phase and recycling the thus recovered methane to said second liquid-liquid extraction zone.

11. A process in accordance with claim 10 wherein the methane is recovered by flashing said second extract phase and by flashing said second raffinate phase, to vaporize the methane contained therein, compressing the resulting vaporous methane, condensing the thus compressed vaporous methane, and returning the resulting liquid methane to said second liquid-liquid extraction zone.

12. A process for obtaining a highly concentrated diolefin product stream from a feedstream comprising said diolefin and at least one monoolefin, which comprises introducing said feedstream into a liquid-liquid extraction column, introducing liquid methane into a lower portion of said column to pass upwardly through said column into contact with said feedstream, introducing into an upper portion of said column to pass downwardly through said column into contact with said feedstream a solvent which is immiscible with liquid methane, which is selective for said diolefin over said monoolefin and which has a sufficiently low freezing point to remain in the liquid phase in contact with the liquid methane, withdrawing from said column an overhead stream comprising liquid methane and monoolefin, withdrawing from said column a bottoms stream comprising said solvent, methane and said diolefin, flashing said bottoms stream to recover vaporous methane, and fractionating the remainder of said bottoms stream to recover a solvent stream and a highly concentrated diolefin product stream.

13. A process in accordance with claim 12 further comprising flashing said overhead stream to produce vaporous methane, combining the thus produced vaporous methane and the vaporous methane produced by flashing the said bottoms stream, compressing the thus combined vaporous methane stream, condensing the thus compressed vaporous methane, recycling the thus produced liquid methane to said lower portion of said column, and recycling said solvent stream to said upper portion of said column.

14. A process in accordance with claim 13 wherein said diolefin is isoprene.

15. A process in accordance with claim 14 wherein said solvent is methyl alcohol.

No references cited.

DELBERT E. GANTZ, *Primary Examiner.*

G. E. SCHMITKONS, *Assistant Examiner.*